(No Model.)
W. MONT STORM.
ELECTRIC BATTERY.
No. 594,917. Patented Dec. 7, 1897.
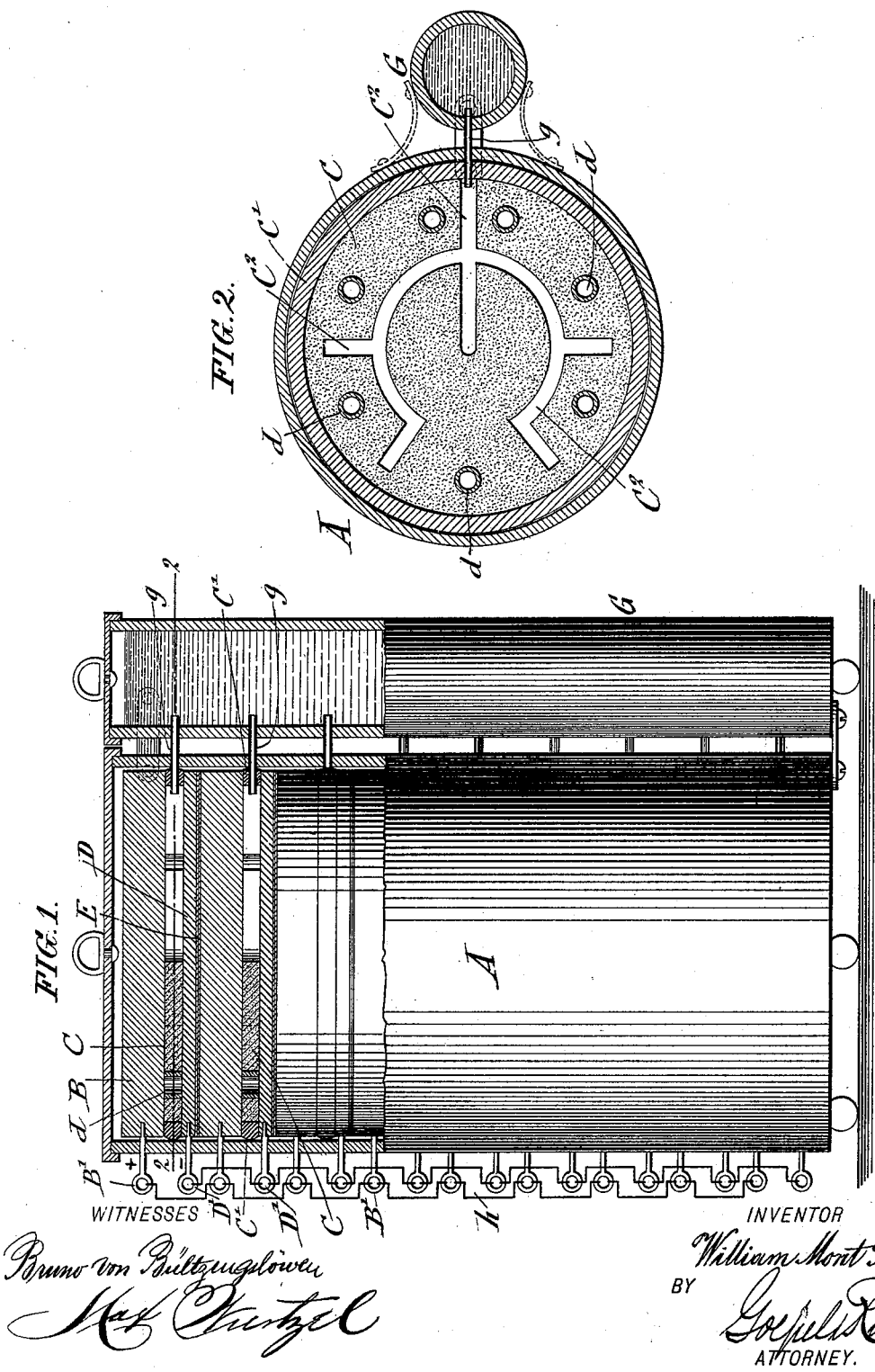

UNITED STATES PATENT OFFICE.

WILLIAM MONT STORM, OF NEW YORK, N. Y.

ELECTRIC BATTERY.

SPECIFICATION forming part of Letters Patent No. 594,917, dated December 7, 1897.

Application filed December 8, 1896. Serial No. 614,878. (No model.)

*To all whom it may concern:*

Be it known that I, WILLIAM MONT STORM, a citizen of the United States, residing at New York, in the county and State of New York, have invented certain new and useful Improvements in Electric Batteries, of which the following is a specification.

This invention relates to an electric battery, the object of which is to combine compactness with a considerable degree of electric energy, durability, and efficiency.

My invention consists of an electric battery which comprises a cell or case containing a series of superposed elements, each series consisting of, first, zinc; second, an absorbent layer for containing a solution of sulfuric acid or other exciting liquid; then a plate of copper, and, lastly, a sheet of insulating material, all the layers of absorbent material being connected with a suitable source of supply of the exciting liquid and the poles of the zinc and copper elements extending out through the sides of the cell.

In the accompanying drawings, Figure 1 is a partially-sectioned side elevation of my improved electric battery. Fig. 2 is a transverse section on line 2 2, Fig. 1.

Similar letters of reference indicate corresponding parts.

Referring to the drawings, A represents the inclosing cell or case of my improved electric battery, which is preferably cylindrical in form and is composed of a number of layers of thick varnished paper firmly cemented together. In the cell A are contained, in the order named, a zinc element B, a layer of absorbent material C, a copper plate D, and an insulating sheet or layer E. The zinc element B is preferably coated with mercury to amalgamate it.

Immediately below the zinc element B is arranged the layer of thick cotton felt C, which layer serves to absorb and diffuse the exciting fluid of the battery which is to act on the zinc. The exciting fluid may consist of suitably-diluted sulfuric acid—as, for instance, one part of sulfuric acid and twenty parts of water—or other similar exciting fluid may be utilized. Arranged at suitable intervals within the body of the layer of felt C are a number of short sections $d$ of glass tubing, which extend transversely of the layer and which act as chocks to support the weight of the superimposed elements and prevent the compressing of the material constituting the layers C, which would detract from the absorbability of the same. The absorbent layer C is arranged upon the copper plate D, which in turn rests upon the sheet E of rubber-coated canvas or other suitable insulating material, whereby the lowermost copper element of one series, such as described, is separated and insulated from the uppermost zinc element B of the next adjacent series, which arrangement is followed out throughout the battery, so that in practice the battery preferably contains a number of series constituting the described elements or parts.

Arranged alongside of the battery and suitably connected therewith is a reservoir G for containing the exciting fluid of the battery. Small tubes $g$ extend from the reservoir G through the wall of the case or cell A and project through rubber rings C', which constitute the surrounding rims of the circumferences of the absorbent layers C, and into the absorbent body of said layers, whereby the exciting fluid is conducted into said absorbent layers.

In order to facilitate the access to and permeating of all parts of the absorbent layers by the exciting fluid, said layers are preferably provided with channels or passages $C^2$ in any suitable arrangement or form.

The respective poles B' and D' of the zinc elements B and the copper elements D are passed through the side wall of the case or cell A, through which pole the main conductor $h$ for the electricity passes.

Having thus described my invention, what I claim is—

1. In an electric battery, an absorbent layer provided with a number of small glass tubes or chocks for preventing the compressing of the material, substantially as set forth.

2. In an electric battery, the absorbent layer constructed with channels for the free passage and distribution of the exciting fluid and provided with a number of glass pieces or chocks for preventing the compressing of the material, substantially as set forth.

In testimony that I claim the foregoing as my invention I have signed my name in presence of two subscribing witnesses.

WM. MONT STORM.

Witnesses:
PAUL GOEPEL,
GEO. W. JAEKEL.